US010216605B2

(12) United States Patent
Cox et al.

(10) Patent No.: US 10,216,605 B2
(45) Date of Patent: Feb. 26, 2019

(54) ELAPSED TIME INDICATIONS FOR SOURCE CODE IN DEVELOPMENT ENVIRONMENT

(71) Applicant: INTERNATIONAL BUSINESS MACHINES CORPORATION, Armonk, NY (US)

(72) Inventors: Benjamin D. Cox, Hursley (GB); Daniel P. Craggs, Montreal (CA); Christopher J. Poole, Hursley (GB)

(73) Assignee: International Business Machines Corporation, Armonk, NY (US)

( * ) Notice: Subject to any disclaimer, the term of this patent is extended or adjusted under 35 U.S.C. 154(b) by 319 days.

(21) Appl. No.: 14/975,902

(22) Filed: Dec. 21, 2015

(65) Prior Publication Data
US 2016/0179654 A1    Jun. 23, 2016

(30) Foreign Application Priority Data
Dec. 22, 2014   (GB) .................................. 1422918.1

(51) Int. Cl.
*G06F 9/44* (2018.01)
*G06F 11/34* (2006.01)

(52) U.S. Cl.
CPC .......... *G06F 11/34* (2013.01); *G06F 11/3419* (2013.01); *G06F 11/3466* (2013.01); *G06F 2201/865* (2013.01)

(58) Field of Classification Search
CPC ................. G06F 11/34; G06F 11/3419; G06F 2201/865; G06F 11/3466
USPC ....................................................... 717/127
See application file for complete search history.

(56) References Cited

U.S. PATENT DOCUMENTS

| 7,426,731 | B2* | 9/2008 | Findeisen | G06F 11/3423 714/E11.196 |
| 7,926,040 | B2* | 4/2011 | Aubertine | G06F 9/45508 717/115 |
| 8,166,348 | B1* | 4/2012 | Kulkarni | G06F 11/0793 714/38.1 |
| 8,464,224 | B2* | 6/2013 | Dulip | G06F 11/3419 717/128 |

(Continued)

FOREIGN PATENT DOCUMENTS

EP    2405352 A1    1/2012

OTHER PUBLICATIONS

Anonymous "How to Measure Elapsed Execution Time in Java—StopWatch Example", Javarevisited website, URL: http://javarevisited.blogspot.com/2012/04/how-to-measure-elapsed-execution-time.html (originally published Apr. 2012) (3 pages).

(Continued)

*Primary Examiner* — Lewis A Bullock, Jr.
*Assistant Examiner* — Theodore E Hebert
(74) *Attorney, Agent, or Firm* — Heslin Rothenberg Farley & Mesiti P.C.; William Kinnaman, Jr.

(57) ABSTRACT

Method and system are provided for providing elapsed time indications for source code in a development environment. The method includes: defining blocks of source code to be timed during source code execution; monitoring defined blocks of source code during execution to determine an elapsed time for the execution of the defined block of source code; recording the elapsed time for a defined block of source code; and providing an elapsed time indication for the defined block of source code.

13 Claims, 6 Drawing Sheets

(56) References Cited

U.S. PATENT DOCUMENTS

| | | | | |
|---|---|---|---|---|
| 8,819,649 B2* | 8/2014 | Lafreniere | ............... | G06F 8/41 |
| | | | | 717/139 |
| 8,856,761 B2* | 10/2014 | Maeda | ................. | G06F 9/4552 |
| | | | | 707/813 |
| 2005/0229176 A1* | 10/2005 | Findeisen | ........... | G06F 11/3423 |
| | | | | 718/100 |
| 2006/0230323 A1* | 10/2006 | Siegwart | .............. | G06F 11/348 |
| | | | | 714/51 |
| 2007/0005297 A1* | 1/2007 | Beresniewicz | .... | G05B 23/0235 |
| | | | | 702/181 |
| 2010/0333072 A1* | 12/2010 | Dulip | ................. | G06F 11/3419 |
| | | | | 717/128 |
| 2013/0055214 A1* | 2/2013 | Harrison | ............ | G06F 11/3676 |
| | | | | 717/127 |
| 2013/0067441 A1* | 3/2013 | Lafreniere | ............... | G06F 8/41 |
| | | | | 717/139 |
| 2013/0262435 A1* | 10/2013 | Bossman | .......... | G06F 17/30463 |
| | | | | 707/716 |
| 2014/0089941 A1* | 3/2014 | Ho | ..................... | G06F 11/3476 |
| | | | | 719/318 |
| 2015/0332195 A1* | 11/2015 | Jue | ................. | G06Q 10/06316 |
| | | | | 705/7.26 |
| 2015/0347282 A1* | 12/2015 | Wingfors | ........... | G06F 11/3688 |
| | | | | 717/125 |
| 2016/0179654 A1* | 6/2016 | Cox | ...................... | G06F 11/34 |
| | | | | 717/127 |

OTHER PUBLICATIONS

Gorti et al., "Runtime Optimization Utilizing Program Structure", Elect. & Comput. Eng., Iowa State Univ., Ames IA, USA; Somani, A.K. (Abstract Only) (Dec. 14-16, 2012) (1 page).

* cited by examiner

ELAPSED TIME INDICATIONS FOR SOURCE CODE IN DEVELOPMENT ENVIRONMENT

PRIOR FOREIGN APPLICATION

This application claims priority from United Kingdom (GB) patent application number 1422918.1, filed Dec. 22, 2014, which is hereby incorporated herein by reference in its entirety.

BACKGROUND

This invention relates to the field of software development. In particular, the invention relates to providing elapsed time indications for source code in a development environment.

Erratic non-failing error conditions during software development stages can be problematic. One cause is timing issues, where something does not work because a section of code did not execute normally for some reason, but also did not throw errors.

For example, during a record retrieval, only 1,000 records were pulled, not the usual 100,000, due to a hardware error that was quickly recovered without throwing errors further up the stack.

Integrated development environments (IDE) are software applications that provide comprehensive facilities to computer programmers for software development. IDEs usually include a source code editor, build automation tools, and a debugger. Some IDEs also include a compiler and/or an interpreter.

There is a continuing need to help a developer to recognize timing issues during code development.

SUMMARY

According to one or more aspects, a method is provided for providing elapsed time indications for source code in a development environment. The method includes: defining blocks of source code to be timed during source code execution; monitoring defined blocks of source code during execution to determine an elapsed time for the execution of the defined blocks of source code; recording the elapsed time for a defined block of source code; and providing an elapsed time indication for the defined block of source code.

In one or more other aspects, a system for providing elapsed time indications for source code in a development environment is provided. The system includes a memory, and a processor communicatively coupled to the memory, wherein the system performs a method, which includes: defining blocks of source code to be timed during source code execution; monitoring defined blocks of source code during execution to determine an elapsed time for the execution of the defined blocks of source code; recording the elapsed time for a defined block of source code; and providing an elapsed time indication for the defined block of source code.

In one or more further aspects, a computer program product is provided for providing elapsed time indications for source code in a development environment. The computer program product includes a computer readable storage medium having program instructions embodied therewith, the program instructions being executable by a processor to cause the processor to perform a method comprising: defining blocks of source code to be timed during source code execution; monitoring defined blocks of source code during execution to determine an elapsed time for the execution of the defined blocks of source code; recording the elapsed time for a defined block of source code; and providing an elapsed time indication for the defined block of source code.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Embodiments of the present invention are described below, by way of example only, with reference to the following drawings, in which.

Figure 1:
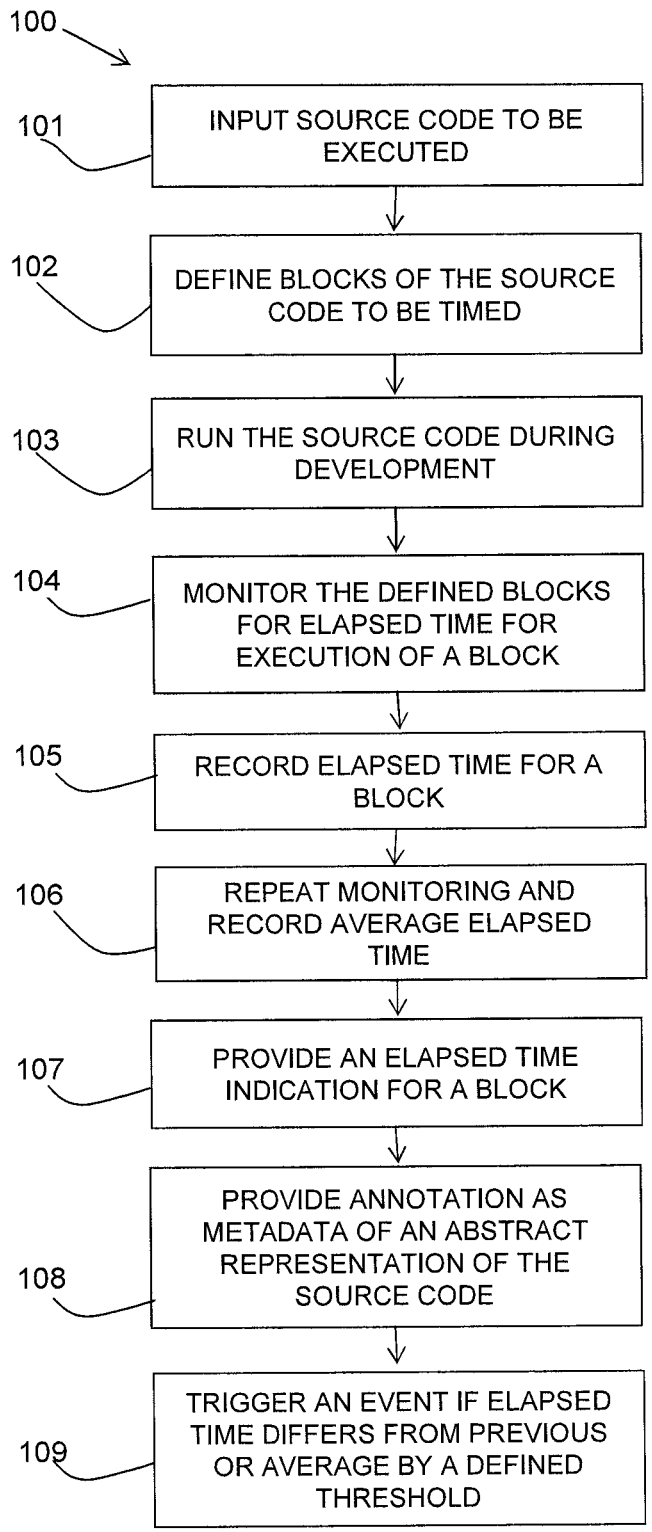
FIG. 1 is a flow diagram of an example embodiment of a method, in accordance with one or more aspects of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

According to one aspect of the present invention, a method is presented for providing elapsed time indications for source code in a development environment, comprising: defining blocks of source code to be timed during source code execution; monitoring defined blocks of source code during execution to determine an elapsed time for the execution of the defined block of source code; recording the elapsed time for a defined block of source code; and providing an elapsed time indication for the defined block of source code.

The method may include representing the source code as an abstract representation, and wherein providing an elapsed time indication provides an annotation of the abstract representation. The annotation may be recorded as metadata for a defined block in the abstract representation. The annotation may be a display indicating the elapsed time.

The method may include: monitoring multiple executions of the source code; and analyzing multiple elapsed times for a defined block, including calculating an average elapsed time and/or standard deviation for a defined block.

Providing an elapsed time indication may provide an alert if an execution of a defined block of code is outside a range of the average elapsed time for the defined block of code.

Providing an elapsed time indication may provide an alert if an elapsed time for a defined block of code differs by a threshold amount from a previous record of an elapsed time for the block of code.

Monitoring defined blocks of source code may be carried out during parsing of source code in a development environment.

The method may be reset when the source code is run on a different hardware environment.

The method may include resetting recorded elapsed time values when the source code is altered. The method may include adjusting recorded elapsed time values for defined blocks of the altered source code.

The method may be carried out during debugging of the source code; and may allow for user input in timing values of the blocks in the source code.

According to another aspect of the present invention, a system is presented for providing elapsed time indications for source code in a development environment, comprising: a block defining component for defining blocks of source code to be timed during source code execution; a time monitoring component for monitoring defined blocks of source code during execution to determine an elapsed time for the execution of the defined block of source code; a time recording component for recording the elapsed time for a defined block of source code; and an annotating component for providing an elapsed time indication for the defined block of source code.

The annotating component may include representing the source code as an abstract representation, and wherein providing an elapsed time indication provides an annotation of the abstract representation. The annotating component may be for recording annotations as metadata for a defined block in the abstract representation.

The system may include a time analysis component for: monitoring multiple executions of the source code; and analyzing multiple elapsed times for a defined block, including calculating an average elapsed time and/or standard deviation for a defined block.

An alert component may provide an alert if an execution of a defined block of code is outside a range of the average elapsed time for the defined block of code.

The system may be provided a development environment and the time monitoring component may be for monitoring defined blocks of source code is carried out during parsing of source code.

The system may include an environment adjusting component for resetting the data when the source code is run on a different hardware environment.

The system may include a debugging adjusting component for carrying out the method during debugging of the source code and allowing for user input in timing values of the blocks in the source code.

According to a further aspect of the present invention, a computer program is provided stored on a computer readable medium and loadable into the internal memory of a digital computer, comprising software code portions, when the program is run on a computer, for performing one or more of the methods summarized above of the present invention.

According to another aspect of the present invention, there is provided a method substantially as described with reference to the figures. Also, according to a still further aspect of the present invention, there is provided a system substantially as described with reference to the figures.

The described aspects of the invention provide the advantage of maintaining performance data for specified sections of code within an integrated development environment.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The described method and system record the time taken to pass through logical blocks of code during development runtime or debugging such that the information is made available while reading the source code. Logical blocks of code that may be timed are, for example, a method, a loop, a function block, a conditional statement, or a user defined block of code.

At a glance, the developer can easily see issues in his code, or potential issues in the underlying framework or upstream components which are shown by a difference in elapsed time of a block of code compared to one or more earlier iterations of the execution.

The described method and system record elapsed time taken by defined sections of source code during evaluation. The recorded elapsed time is subsequently processed and may be tagged as metadata to a representation of the source code. The annotation may be made to the abstract syntax tree used internally by IDEs.

The recorded time data as well as using elapsed time information may provide information on the average or standard deviation of the time compared to the last run or to a running average.

Referring to FIG. 1, a flow diagram 100 shows an embodiment of the described method as carried out in an IDE at runtime of source code or debugging.

A source code is input 101 to be executed with the described time monitoring. Blocks within the source code are defined 102 for which the elapsed time is to be monitored. The blocks may be defined by type, for example, loops, conditional statements, function blocks, etc. In addition, a developer may select blocks for time monitoring An alternative embodiment may set timing breakpoints on every function in a source file. So the first breakpoint is set on function entry, and the last breakpoint is set on function exit (typically a return statement).

A further embodiment may set the timing for every line in the source code. This would be implemented by setting a breakpoint on every line, and timing how long it takes to execute each line of code. This has the disadvantage of increased debugging time, but when compared to similar style runs, would provide useful data.

The source code may be executed or run 103 during development. During such execution, the method monitors 104 the defined blocks of source code to record 105 an elapsed time for the execution of the defined block of source code. The elapsed time may be recorded as the wall time, counters, CPU time, etc., and each may have an advantage depending on the scenario.

The monitoring and recording may be repeated 106 for repeat executions of the source code resulting in the collection of multiple time elapse values for each block. This data may be analyzed to obtain an average elapsed time for a block and its standard deviation.

An indication of elapsed time for a block in the source code may be provided 107, for instance, by tagging or annotating the block in the source code. This may be provided as a tagging or an annotation 108 of the blocks shown in an abstract representation of the source code as used in a development environment.

Metadata may be used as an annotation of the blocks in the source code or in the abstract representation of the source code. The annotations may relate to the last monitored elapsed time for a block, or an average elapsed time over multiple executions of the block.

The form of the annotations and their display could take many forms. In one example, a simple piece of text "5 sec" may be provided next to the associated block or structure. In another example, coloring of the background of that block of code may be provided. In a further example, an editor may use an editor ruler to color-code timing issues (for example, green for normal time, yellow for slow execution times, and red for very slow).

An alert or event may be triggered 109 if a newly monitored elapsed time for a block differs compared to a previous elapsed time or to an average by a defined amount.

Referring to the above coloring example, a block whose last run was X standard deviations away from the average running time may be indicated in red as an alert to the user. If the recorded elapsed time is sufficiently far from what is usual, an event can be triggered to notify the developer that this session is not reproducing the usual runtime experience. For example, a particular "if" statement and its contents usually takes 10 seconds to evaluate, but in a monitored code run it only took 1 second, this indicates that something is unusual in the monitored run.

The options for monitoring, display and alerts may all be set in a configuration system.

During debug time, there exists the problem that the system may wait for user input. To combat this, an embodiment is described in which a "stopwatch" system may be used. The stopwatch separately times how long the system has spent waiting for the user, while in the specified block of code that is being timed. The stopwatch recorded value may then be subtracted from the elapsed time.

In an alternative embodiment, the same system can be employed, but with a separate list of time values for a debug session only. This is to allow for additional issues with the IDE doing different things given the debug session and other potential flags raised when in a debug session.

This feature of an IDE is intended to be run in a local development environment; the changing of hardware (e.g., a new laptop) would necessitate either a resetting of the data, or a calibration process.

This feature of an IDE may also include suspension of the timer when a machine interacts with a remote system. In a similar manner to the "stopwatch" of waiting for user input, suspension may be implemented while a remote system is being accessed.

The values could be reset or, more generally, processed and adapted, when the code has changed (either by the user or the compiler). For example, timings may be found for a block that has been interpreted. If the compiler then compiles this block (after it notices it's been called several times), the timings could either be reset, or adjusted to compensate by some quantity. (For example, perhaps it is determined that the speed increase of this compilation step has an average order of magnitude, and thus a function could be used to adjust the timings suitably.)

The interpreted timing values could be adjusted to match the new compiled timing values (or vice versa) by mapping each value by using a function.

Specifically, the function could be $F(x)=0$, for each interpreted item x, thus resetting the system, but equally it could be $F(x)=x*0.2$ if there's that improvement in the compilation, and it's known.

Figure 2:
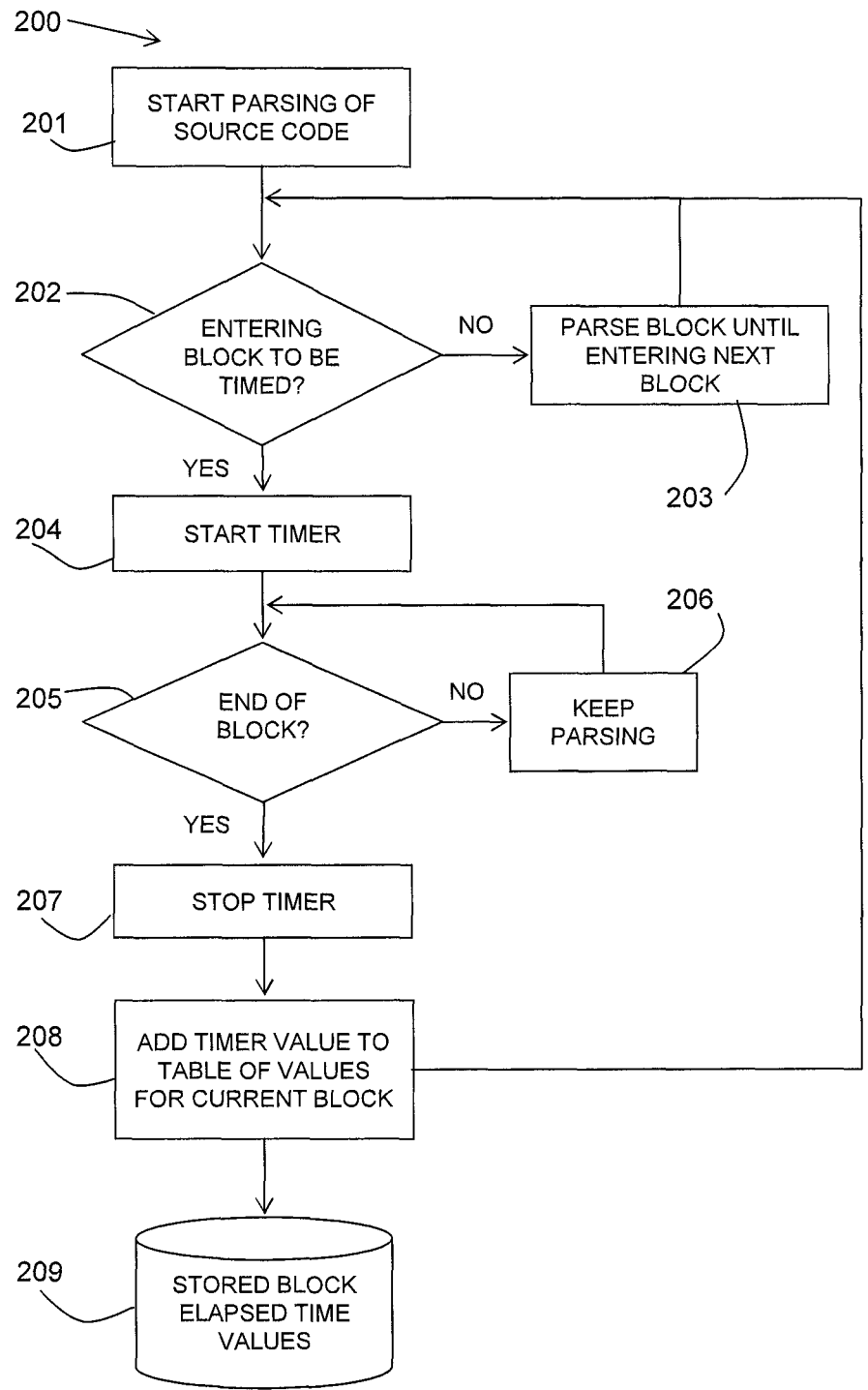
FIG. 2 is a flow diagram of an exemplary process of a method, in accordance with one or more aspects of the present invention.

FIG. 2 shows a flow diagram 200 of an example embodiment of an aspect of the described method involved during runtime parsing of code. This may also be applied during debugging of code.

Parsing of source code is started 201, and it may be determined 202 if the parsing is entering a block of code which is to be timed. If it is not entering such a block, the code is continued to be parsed 203 until another block is entered.

If it is determined 202 that the parsing is entering a block to be timed, a timer is started 204. It may then be determined 205, when the block ends. If the block has not yet ended, the parsing continues 206. When it is determined 205 that the block has ended, the timer is stopped 207.

The elapsed time value for the current block may be added 208 to a stored table of values 209. By setting start and end breakpoints, the stored values can represent a block by two breakpoint representations. Stored breakpoints are already a feature in many IDEs and debug engines and typically store the line number, source file location, source filename and type of breakpoint.

Figure 3:
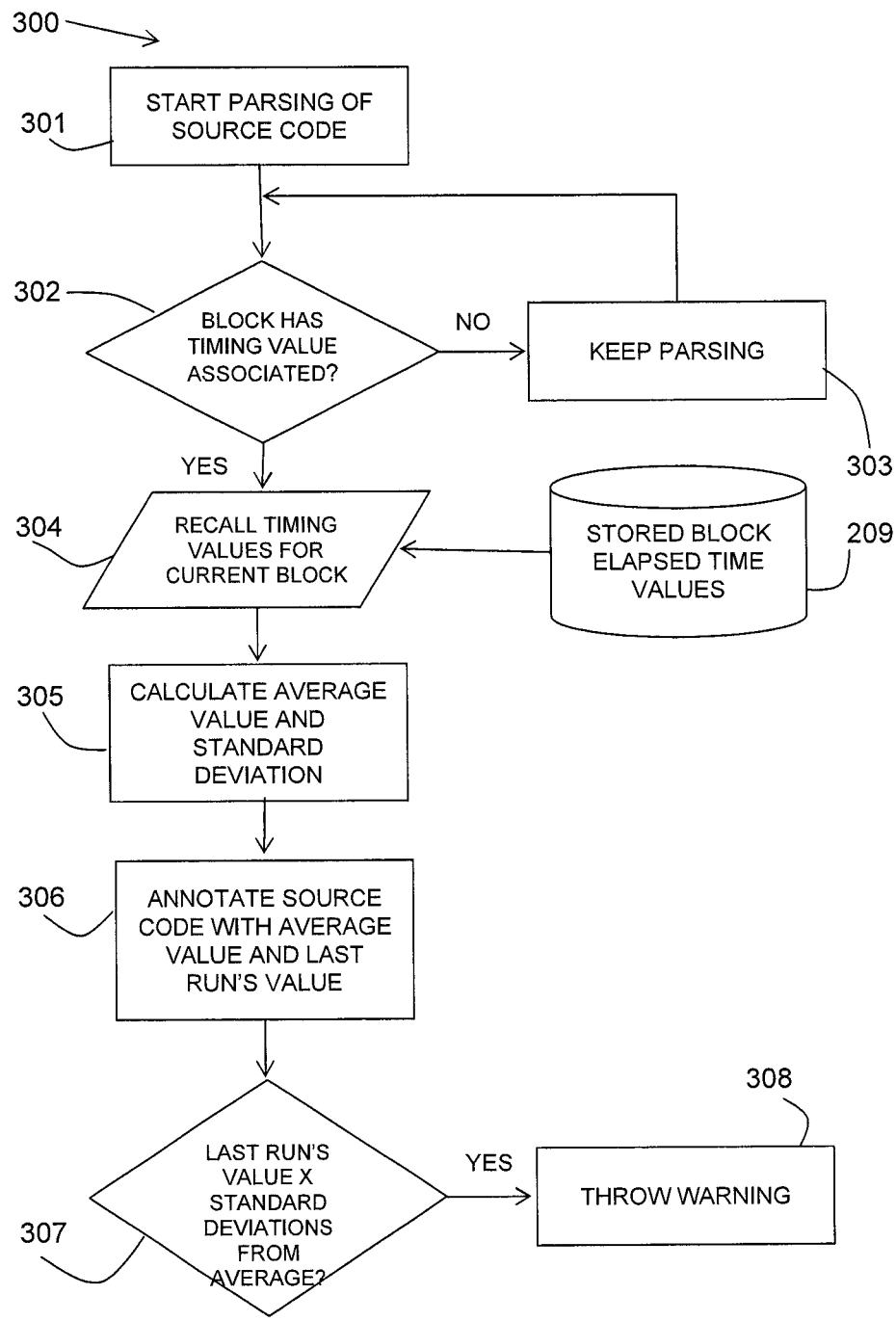
FIG. 3 is a flow diagram of an exemplary process of a method, in accordance with one or more aspects of the present invention.

Referring to FIG. 3, a flow diagram 300 shows an example embodiment of an additional aspect of the described method.

Parsing of source code is started 301, and it may be determined 302 if the current block has a timing value already associated with it. If it does not have an existing timing value, then the parsing is continued and the method of FIG. 2 may be carried out to record a first timing value for the block.

If the block has a timing value, then the timing values for the current block may be recalled 304 from a stored table of values 209. An average value of the timing values may be calculated 305 together with the standard deviation from the average.

It may then be determined 307 if a last run of the block's timing value is divergent from the average. For example, it may be determined if it is a defined number X standard deviations from the average. If so, a warning may be provided 308.

Figure 4:
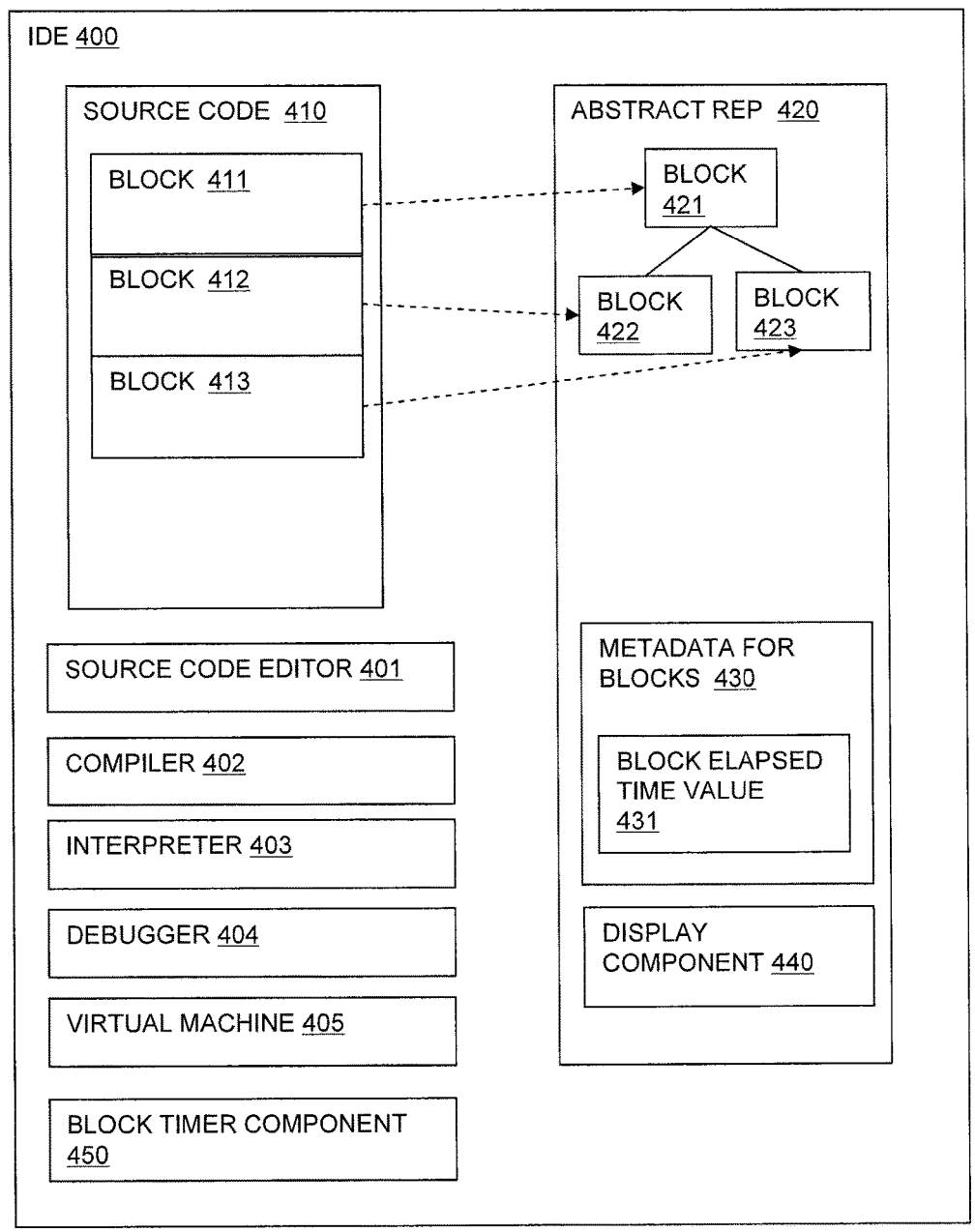
FIG. 4 is a block diagram of an integrated development environment in which one or more aspects of the present invention may be implemented.

Referring to FIG. 4, a block diagram shows an embodiment of an IDE 400, in which the described method and system may be implemented.

An IDE 400 has a source code editor 401 for writing and editing source code 410. A compiler 402 may be provided for transforming source code into another language. An interpreter 403 may be provided for executing the source code by parsing it and executing it on a virtual machine 405. The IDE 400 may also include a debugger for analyzing source code to identify bugs.

An IDE 400 may generate and display an abstract representation 420 of the source code 410 by representing blocks 411, 412, 413 of the source code as nodes 421, 422, 423 of an abstract representation 420 such as an abstract syntax tree (AST). The blocks 411, 412, 413 of the source code 410 may be mapped to the nodes 421, 422, 423 of the abstract representation 420. IDEs maintain an AST of the source code to aid syntax highlighting, refactoring, and other functions.

The described system provides a block timer component 450 for timing the execution of blocks 411, 412, 413 of the source code 410. The results of the block timer component 450 may be recorded as metadata 430 for the blocks 421, 422, 423 of the abstract representation 420. A display component 440 in association with the block timer component 450 and the abstract representation 420 may annotate the abstract representation 420 to display the timing results.

Performance profiling tools for source code are very powerful and useful for resolving performance defects. Detailed breakdowns of the application run-time, call paths and associated costs can be obtained by instructing the virtual machine 405 such that a lot of data is retrieved to help with this analysis. The described method instructs the runtime compiler 402 or interpreter 403 to record the times of certain paths it is traversing in a consumable format and method. This information may be used to subsequently augment and modify an abstract syntax tree (AST) data for clearer performance analysis.

There exists a link between the runtime execution and parsing of the source code by an interpreter 403 (e.g., in the JVM). Tracking which code blocks are being entered and exited already exists; the described method, with a flag in the interpreter 403, records the time of the events, to calculate an elapsed time. This may be added as metadata 430 to that item in the AST. On successive runs, this step is performed, such that the average time can be persisted in the metadata 430.

An IDE is a program that allows you to view and edit source code, but also adds value by improving that experience with a number of features. Some of these can be counted in real time, whereby the code editor and other aspects of the user interface update as the user types, and these often involve the parsing of the source code by an interpreter, and forming that code into an in-memory model known as an Abstract Syntax Tree (AST) in order to show information like compilation errors and code structure. Alternatively, other features of an IDE can be counted as requiring action, such as starting of a new runtime execution. Often, in the case of virtualized languages such as Java, this will involve the creation of a virtual machine (VM) to run the code in, which can be subject to dynamic optimization techniques such as Just In Time (JIT) compilation.

The code for the described elapsed time analysis can reside alongside the debugger user interface code. In some applications, editors can be extended to add annotations and color coding. The timing data can be stored during a debug session in the workspace of the application (specifically the debug plugins area), and recalled in future debug sessions.

The following gives a simplified example of the outcome of the method. Here a block of code is defined for monitoring as follows:

```
print "hello world"
if ( some_expression ) {
  do something complicated;
}
```

This may be represented by an AST, and after a plurality of runs, the defined (if statement) block could be annotated by a background color of a defined hue, or additional text (either in the background, or somewhere to the side), such as:

```
print "hello world"
```

```
if ( some_expression ) {  2s
  do something complicated;
}
```

Internally, each block of code has associated with it a list of values. This may be each or some nodes in the AST. From this, the average can be found, along with the standard deviation. At each run, the same logic is performed. If the last-run time is too far from the average time seen at normal runtime, an alert can be thrown. This may be carried out by setting a threshold using the standard deviation of the previous runs or a value based on it.

Figure 5:
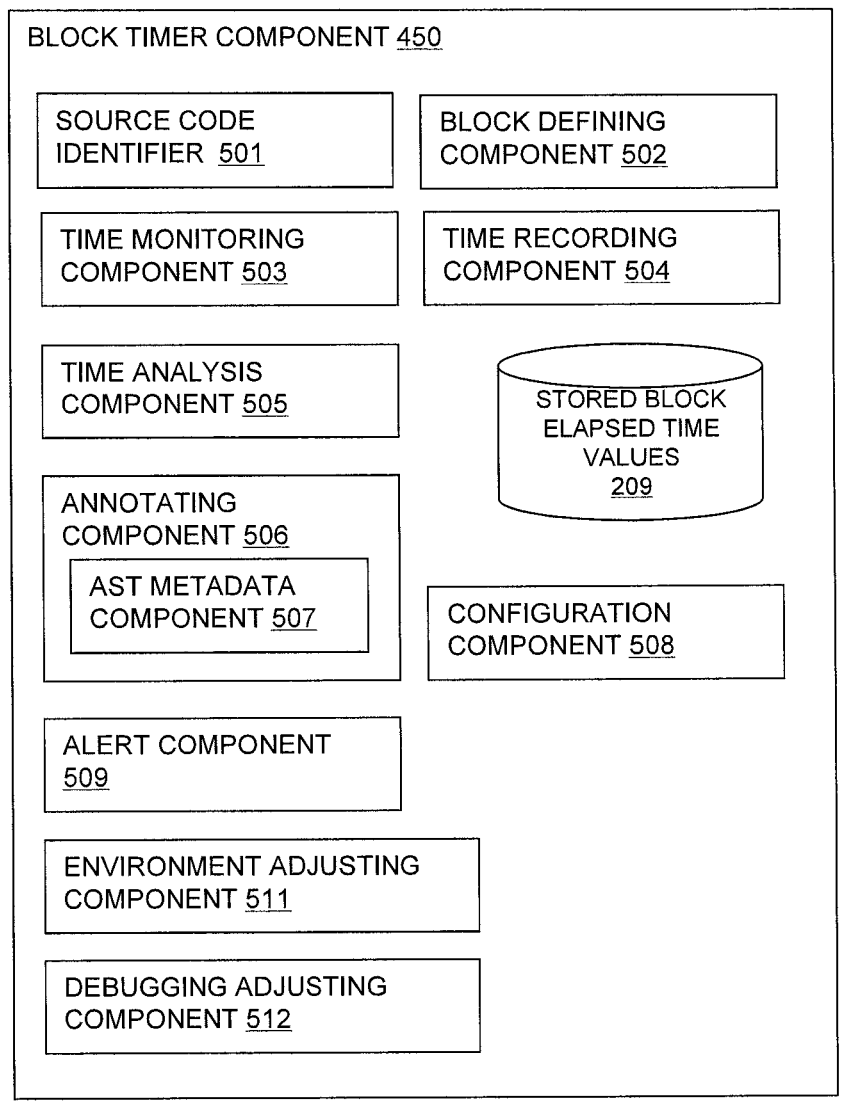
FIG. 5 is block diagram of an example embodiment of a system, in accordance with one or more aspects of the present invention.

Referring to FIG. 5, a block diagram shows an embodiment of the described system in the form of a block timer component 450 as shown in an IDE 400 of FIG. 4.

The block timer component 450 may include a source code identifier 501 for selecting or otherwise identifying a source code to analyze using the block timer component 450. This may be during a runtime or debugging session. A block defining component 502 may be used to define blocks to be timed, by type of block or by manual intervention.

A time monitoring component 503 may monitor the execution of the source code to time the defined blocks as described in FIGS. 2 and 3. A time recording component 504 may record the timing values for blocks in a store 209 of block elapsed time values.

A time analysis component 505 may analyze repeated timing values for the same block in different execution to obtain an average and standard deviation of the timing value for a block.

An annotating component 506 may display the timing results, for example using an AST metadata component 507 to display the timing results against nodes representing the blocks of data in an AST.

A configuration component 508 may be provided enabling a user to set configuration parameters such as the type of display, the threshold for an alert for a timing value deviating from an average or previous value, etc.

An alert component 509 may be providing for triggering an event to provide a user with an alert if a timing value for a block differs significantly from previous or average values.

A further aspect may be provided by an environment adjusting component 511 for adjusting timing values for a new hardware environment in which the source code is run.

A yet further aspect may be provided by a debugging adjusting component 512 which may allow for use input in the timing values required during a debugging process.

Figure 6:
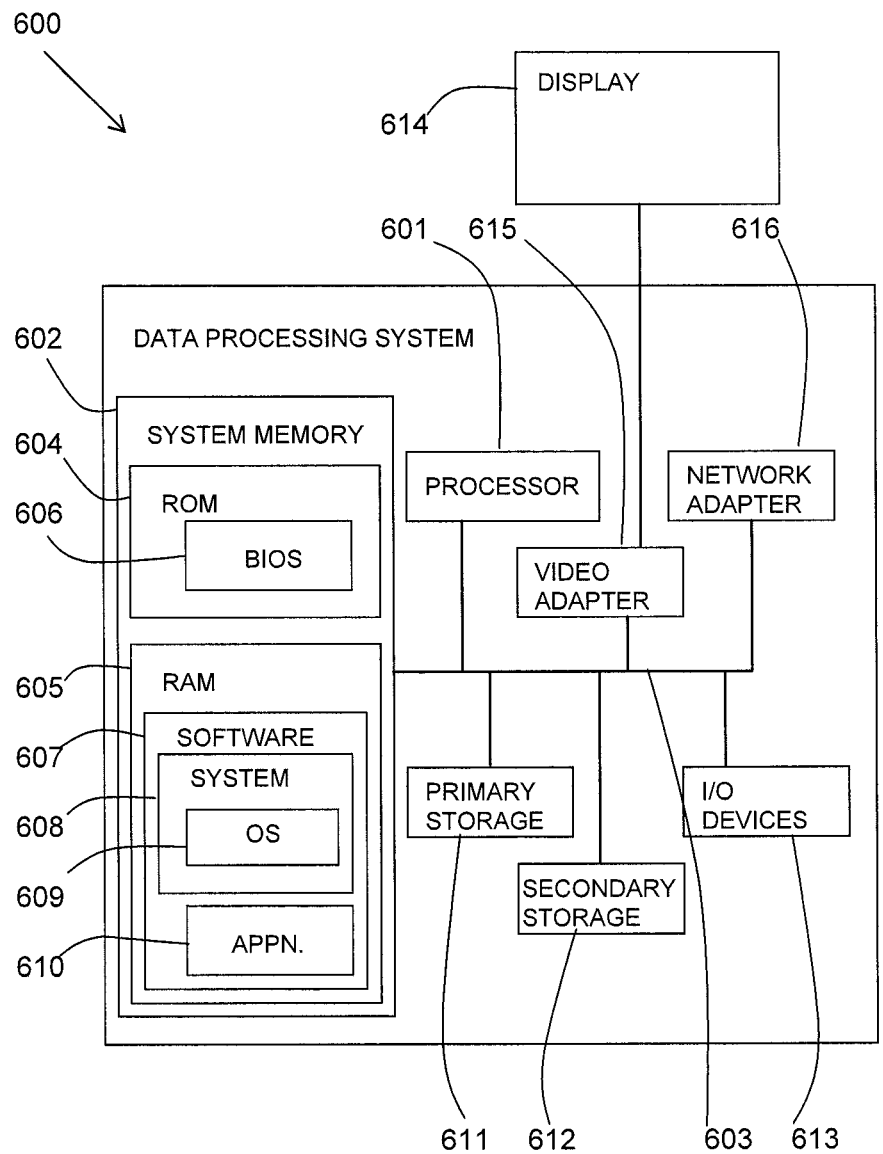
FIG. 6 is a block diagram of an embodiment of a computer system in which one or more aspects of the present invention may be implemented.

Referring to FIG. 6, an exemplary system for implementing aspects of the invention includes a data processing system 600 suitable for storing and/or executing program code including at least one processor 601 coupled directly or indirectly to memory elements through a bus system 603. The memory elements may include local memory employed during actual execution of the program code, bulk storage, and cache memories which provide temporary storage of at least some program code in order to reduce the number of times code must be retrieved from bulk storage during execution.

The memory elements may include system memory 602 in the form of read only memory (ROM) 604 and random access memory (RAM) 605. A basic input/output system (BIOS) 606 may be stored in ROM 604. Software 607 may be stored in RAM 605 including system software 608 such as operating system software 609. Software applications 610 may also be stored in RAM 605.

The system 600 may also include a primary storage means 611 such as a magnetic hard disk drive and secondary storage means 612 such as a magnetic disc drive and an optical disc drive. The drives and their associated computer-readable media provide non-volatile storage of computer-executable instructions, data structures, program modules and other data for the system 600. Software applications may be stored on the primary and secondary storage means 611, 612 as well as the system memory 602.

The computing system 600 may operate in a networked environment using logical connections to one or more remote computers via a network adapter 616.

Input/output devices 613 may be coupled to the system either directly or through intervening I/O controllers. A user may enter commands and information into the system 600 through input devices such as a keyboard, pointing device, or other input devices (for example, microphone, joy stick, game pad, satellite dish, scanner, or the like). Output devices may include speakers, printers, etc. A display device 614 is also connected to system bus 603 via an interface, such as video adapter 615.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Improvements and modifications can be made to the foregoing without departing from the scope of the present invention.

What is claimed is:

1. A method for providing elapsed time indications for source code in a development environment, comprising:
    importing, by one or more processors, source code, into an integrated development environment;
    defining, by the one or more processors, blocks of the source code to be timed during source code execution in the integrated development environment, wherein the defining comprises setting breakpoints in the source code to differentiate the blocks, wherein each block comprises a line of the source code;
    executing, by the one or more processors, the source code, in the integrated development environment repetitively;
    monitoring defined blocks of the source code during the repetitive executing to determine, for each iteration: an elapsed time, an average elapsed time for the execution of each defined block of the defined blocks of the source code, and a standard deviation for each defined block of the defined blocks;
    annotating a specific defined block of the source code of the defined blocks of source code with the average elapsed time for the specific defined block of the source code and the standard deviation for the specific defined block of the source code;
    subsequent to the annotating, executing, the specific defined block of the source code in the integrated development environment, wherein the executing comprises:
        providing an elapsed time indication for the elapsed time for the specific defined block of the source code by displaying the elapsed time indication in a graphical user interface of the integrated development environment; and
        displaying, in the graphical interface, an alert, if the elapsed time exceeds the average elapsed time for the specific defined block of the source code by greater than the standard deviation for the specific defined block of the source code; and
    resetting, by the one or more processors, the method, when the source code is run on a different hardware environment.

2. The method of claim 1, wherein displaying the elapsed time further comprises representing the source code as an abstract representation.

3. The method as claimed in claim 2, further comprising: recording the annotation as metadata for the specific defined block in the abstract representation.

4. The method of claim 1, further comprising:
    determining, by the one or more processors, that the elapsed time for the specific defined block of source code differs by a threshold amount from an elapsed time of a previous iteration for the specific defined block of code; and
    providing, by the one or more processors, an alert based on the determining.

5. The method of claim 1, wherein the monitoring comprises parsing the source code during the executing.

6. The method of claim 1, further comprising:
    updating, by the one or more processors, the source code; and
    resetting the average elapsed time based on the source code being updated.

7. The method of claim 1, further comprising:
    updating, by the one or more processors, the source code; and
    adjusting the average elapsed time for each of the defined blocks of updated source code.

8. The method of claim 1, wherein the executing is in a debugging mode, further comprising:
    allowing for user input in timing values of the blocks in the source code.

9. A system for providing elapsed time indications for source code in a development environment, comprising:
    a memory; and
    one or more processors communicatively coupled to the memory, wherein the system performs a method comprising:
        importing, by the one or more processor, source code, into an integrated development environment;
        defining, by the one or more processors, blocks of the source code to be timed during source code execution in the integrated development environment, wherein the defining comprises setting breakpoints in the source code to differentiate the blocks, wherein each block comprises a line of the source code;
        executing, by the one or more processors, the source code, in the integrated development environment repetitively;
        monitoring defined blocks of the source code during the repetitive executing to determine, for each iteration: an elapsed time, an average elapsed time for the execution of each defined block of the defined blocks of the source code, and a standard deviation for each defined block of the defined blocks;
        annotating a specific defined block of the source code of the defined blocks of source code with the average elapsed time for the specific defined block of the source code and the standard deviation for the specific defined block of the source code;
        subsequent to the annotating, executing, the specific defined block of the source code in the integrated development environment, wherein the executing comprises:
            providing an elapsed time indication for the elapsed time for the specific defined block of the source code by displaying the elapsed time indication in a graphical user interface of the integrated development environment; and
            displaying, in the graphical interface, an alert, if the elapsed time exceeds the average elapsed time for the specific defined block of the source code by greater than the standard deviation for the specific defined block of the source code; and resetting, by the one or more processors, the method, when the source code is run on a different hardware environment.

10. The system of claim 9, wherein displaying the elapsed time further comprises representing the source code as an abstract representation.

11. The system of claim 10, the method further comprising:
  recording the annotation as metadata for the specific defined block in the abstract representation.

12. The system of claim 9, wherein the monitoring comprises parsing the source code during the executing.

13. A computer program product for providing elapsed time indications for source code in a development environment, the computer program product comprising:
  a computer readable storage medium having program instructions embodied therewith, the program instructions being executable by a processor to cause the processor to perform a method comprising:
    importing, by the one or more processor, source code, into an integrated development environment;
    defining, by the one or more processors, blocks of the source code to be timed during source code execution in the integrated development environment, wherein the defining comprises setting breakpoints in the source code to differentiate the blocks, wherein each block comprises a line of the source code;
    executing, by the one or more processors, the source code, in the integrated development environment repetitively;
    monitoring defined blocks of the source code during the repetitive executing to determine, for each iteration:
      an elapsed time, an average elapsed time for the execution of each defined block of the defined blocks of the source code, and a standard deviation for each defined block of the defined blocks;
    annotating a specific defined block of the source code of the defined blocks of source code with the average elapsed time for the specific defined block of the source code and the standard deviation for the specific defined block of the source code;
    subsequent to the annotating, executing, the specific defined block of the source code in the integrated development environment, wherein the executing comprises:
      providing an elapsed time indication for the elapsed time for the specific defined block of the source code by displaying the elapsed time indication in a graphical user interface of the integrated development environment; and
      displaying, in the graphical interface, an alert, if the elapsed time exceeds the average elapsed time for the specific defined block of the source code by greater than the standard deviation for the specific defined block of the source code; and
    resetting, by the one or more processors, the method, when the source code is run on a different hardware environment.

* * * * *